United States Patent Office 2,844,456
Patented July 22, 1958

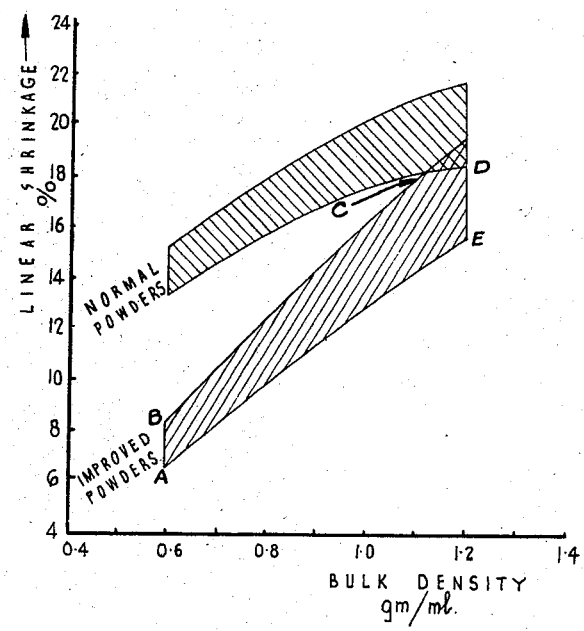
David M. Llewelyn
Alexander B. Simpson
De Witt H. West
*Inventors*

2,844,456

PRODUCTION OF NICKEL OR IRON POWDER

David M. Llewelyn, Sunnybank, Clydach, Alexander B. Simpson, Brynmill, Swansea, and De Witt H. West, Port Eynon, Swansea, Wales, assignors to The International Nickel Company, Inc., New York, N. Y., a company of Delaware Application December 14, 1954, Serial No. 475,136

13 Claims. (Cl. 75—.5)

The present invention relates to improved nickel and iron powders and to an improved process for making them.

Nickel or iron powder can be produced by thermal decomposition of the corresponding carbonyl in the free space of a vessel having heated walls. The form of the powder produced is known to vary, according to the decomposition conditions, from discrete particles, generally approximately spherical in shape in the case of iron but somewhat irregular in the case of nickel, to aggregates of interlocking filaments or chains. The microscopic appearance of the latter type of powder is of small spongy flakes. It is characterised by a low bulk density, generally below 1.6 gm./ml. down to 0.9 gm./ml. or 0.8 gm./ml. or even to 0.3 gm./ml., and is known as type "B" or "cotton-wool" powder.

Very little is known in the art about how to control the manufacture of "B" type powders. Patent No. 1,759,659 of Mittasch, Schlecht, and Schubardt mentions this type of iron powder as one of the possible products of the thermal decomposition of iron carbonyl in the free space at a temperature between 100° and 400° C. and according to Patent No. 1,759,661 of Müller and Schubardt such powders are produced "at higher temperatures" of decomposition. Patent No. 1,857,879 (Schubardt) states that light flocculent, cotton-wool-like powder may be made, in particular, when operating in small decomposition furnaces and with great output. Final Report No. 1575 of the British Intelligence Objectives Sub-committee indicates that nickel powder of very low packing density can be produced by increasing the throughput in the standard decomposer, and that a still lighter powder might be made by increasing the temperature of decomposition.

The method hitherto used in practice for decomposing nickel or iron carbonyl to form "B" type powder has been to vapourise the carbonyl and to pass the carbonyl vapour, undiluted by other gases except, in the case of iron, for a few percent of ammonia, into an upright cylindrical decomposition vessel approximately 1 metre in diameter and 5 metres in height having externally heated walls. The inlet is situated at the centre of the top of the vessel, and the carbonyl vapour is decomposed by the heat supplied from the walls as it flows down the free space within the vessel. The metal powder formed falls to the bottom of the decomposer, whence it is discharged, and the carbon monoxide gas formed is removed through an outlet near the bottom of the vessel. A decomposition temperature of about 300–380° C. is used, and a rate of carbonyl feed high in proportion to the capacity of the decomposer to break it down completely during one pass. Thus with a nickel carbonyl feed rate of 100–160 litres of liquid carbonyl per hour nickel powder is obtained with a bulk density of 0.6 to 1.2 gm./ml. The bulk density of the powder can be varied, as indicated in the prior art mentioned, by varying the decomposition temperature and carbonyl throughput.

The low bulk density of "B" type powder makes it useful for the production by sintering of highly porous bodies, such as electrodes for alkaline accumulators and filter plates and tubes. For these applications it is desirable that the sintered product should have a combination of adequate mechanical strength and high porosity. These qualities are affected by the bulk density and shrinkage on sintering of the powder used. Excessive shrinkage leads to a decrease in the porosity of the product, to binding and distortion during sintering, and to difficulty in making a product of predetermined size and form. If the bulk density is too low, the strength of the product will be inadequate, while if it is too high the porosity will be too low. The trade therefore requires a powder which has the minimum shrinkage on sintering consistent with adequate strength and porosity in the sintered product. For optimum results, it is preferred that the bulk density should be about 0.9 gm./ml., and the shrinkage on sintering 11–13%, e. g. 12%.

It has not hitherto been found possible to make "B" powder, and in particular "B" nickel powder, to comply with these stringent requirements, nor does the art indicate how the process described could be modified to enable this to be done. It is found that by varying the decomposition conditions, in particular the carbonyl throughput and the decomposition temperature, it is only possible to vary the bulk density and linear shrinkage of the product within fairly narrow limits. This is illustrated for the case of nickel by the upper band in the accompanying drawing, which depicts the relationship between bulk density and linear shrinkage in "B" powders produced by the decomposition of nickel carbonyl at varying throughputs and temperatures. At a given bulk density, the shrinkage on sintering is generally found to be unduly high. Thus nickel powders with the preferred linear shrinkage of 11–13% can only be made with a low bulk density of 0.6 gm./ml. or even less, while powders with the preferred bulk density of about 0.9 gm./ml. have a linear shrinkage of as high as 15–19%. "B" powders made in the manner described, by the decomposition of undiluted carbonyl vapour, are hereinafter called "normal" "B" powders.

A further disadvantage of the process described is that, particularly when powders of very low bulk density of the order of 0.6 gm./ml. or less are being made, the operation of the decomposer is unsteady, so that the product obtained is non-uniform.

We have now found that the aforesaid disadvantages can be overcome and an improved form of "B" nickel and iron powder with reduced shrinkage on sintering at a given bulk density obtained with steady and reproducible operation by diluting the carbonyl vapour fed to the decomposer with a substantial amount of a diluent gas and carrying out the decomposition in the presence of a small amount of nuclei for carbonyl decomposition or of an agent promoting the formation of such nuclei.

It is an object of the present invention to provide an improved process for making "B" type nickel and iron powder by the thermal decomposition of the respective carbonyls.

A further object is to provide "B" type nickel and iron powder having a combination of low bulk density and low shrinkage on sintering.

A third object is to provide "B" type nickel and iron powder having for the same bulk density a shrinkage on sintering lower than that of normal "B" powder.

Another object is to provide a process of making "B" type nickel and iron powder having, for the same bulk density, a shrinkage on sintering lower than that of normal "B" powder.

Further objects and advantages of the invention will appear from the following description taken in conjunction with the accompanying drawing.

Broadly stated, our invention contemplates in its process aspect a carbonyl decomposition process in which conditions of throughput and decomposition temperature such as to give a normal "B" type nickel or iron powder are varied simultaneously by (a) introducing a quantity of nuclei for the decomposition, or a quantity of an agent promoting the formation of such nuclei, which is small but effective in the absence of other change to lower the bulk density of the product, and (b) diluting the carbonyl feed with an amount of a diluent gas effective to raise the bulk density of the product which would be produced by (a) alone. Preferably the amount of diluent gas added is such as substantially to counteract the effect of the nuclei or the agent promoting their formation. By this means a "B" powder is obtained whose shrinkage on sintering is lower than that of a normal "B" powder of the same bulk density.

The preferred addition to the carbonyl vapour is oxygen, which may be added as such or as a mixture with other gases, e. g., as air. This addition of oxygen is advantageous in that it not only serves to increase the number of nuclei in the decomposer but also does not introduce impurities into the decomposer. Alternatively a suspension of nuclei may be made by causing some of the carbonyl to react with a reagent which produces very finely divided solid reaction products, for instance chlorine or bromine gas or hydrogen chloride, either in the decomposer or before entering it. A satisfactory suspension of nuclei can also be made by passing diluted carbonyl vapour over nitric acid. A further possibility is to use the method of producing nuclei described in U. S. Patent 2,604,442 (Lambert and Hamm), according to which a part of the carbonyl is decomposed by radiant energy just before its admission to the decomposition space. Again, the nuclei may consist of minute liquid droplets as described in U. S. Patent 2,612,440 (Altmann). Generally speaking, the nuclei or promoting agents must be such that their presence in the decomposition zone will be effective to lower the bulk density of the "B" powder formed, and preferably they are such that they do not contaminate the final product.

The diluent gas used is preferably carbon monoxide or nitrogen, but other inert gases may be used provided they are effective to increase the bulk density of the "B" powder formed.

The method of carrying the invention into practice will now be described and illustrated with particular reference to the production of "B" nickel powder.

Into a standard decomposer one metre in diameter nickel carbonyl vapour was fed at a rate of 130 litres of liquid carbonyl per hour. The decomposition temperature, measured in the conventional manner, was about 325° C. A sample of the powder produced had a bulk density of 0.90 gm./ml. and had a shrinkage on sintering of 22%, giving a sintered product with a porosity of 78%, the temperature in the decomposer fluctuated spontaneously during the reaction.

The process was then varied merely by injecting 15 litres of oxygen per hour, this being the equivalent of 0.03% by volume of the entering gases. The bulk density of the powder fell to 0.60 gm./ml.

The process was then still further varied to bring it into accordance with the invention. In addition to the injection of oxygen, carbon monoxide was added at the rate of 15 cubic metres per hour, thus reducing the carbonyl concentration to about 62%. The density of the resulting powder was found to be 0.88 gm./ml., the shrinkage on sintering being only 9% and the porosity of the sintered body being 86%. The conditions in the decomposer were now found to be quite stable, and the results obtained were fully reproducible.

More generally, by carrying out the decomposition with a feed rate of from 100–160 litres of liquid nickel carbonyl per hour, and a decomposition temperature of 300 to about 380° C., normal "B" nickel powders were obtained having bulk density and shrinkage related as in the upper band in the accompanying drawing.

The conditions of decomposition may be varied according to the invention by adding from 0.01% to 0.08%, preferably 0.02% to 0.06% by volume of oxygen to the inlet vapour and diluting it with carbon monoxide until it contains from 50–75% or even 80% carbonyl, preferably 60–70%. The bulk density and shrinkage of the powder obtained are then found to fall within the lower band or area bounded by the lines A—B—C—D—E in the drawing—i. e. for the same bulk density, the powder produced is the improved powder having a lower shrinkage on sintering than the normal powder. Generally speaking, the powder according to this aspect of the invention has a ratio of shrinkage to bulk density such that linear shrinkage divided by bulk density is less than 15% per gm./ml.

Within the broad ranges given the variables may be altered to control the bulk density as required in the same way as when oxygen free, undiluted carbonyl is used. In particular, at any oxygen addition and dilution, a limit is imposed to the extent to which the temperature can be lowered to raise the bulk density by the onset of wholesale deposition of powder on the walls of the decomposer, which leads to a rapid fall in the internal temperature and necessitates shut-down of the decomposer for cleaning. At carbonyl concentrations above 75% it is for this reason difficult to obtain bulk densities higher than about 0.6 gm./ml. The preferred temperature range, subject to this condition, is 310–360° C.

To produce nickel powder with the optimum combination of a bulk density of about 0.9 gm./ml. and a linear shrinkage of 11–13% we prefer to work with a carbonyl concentration of 58% to 64%, an oxygen addition of 0.02% to 0.06% by volume, a decomposer temperature of 330° to 340° C., and a feed rate in the standard decomposer of 110–140 litres of liquid carbonyl per hour.

It should be noted that the conditions required for "B" powder formation will vary somewhat with the size of the decomposer. In particular, for a smaller decomposer a larger amount of diluent is needed to produce the same effect on the bulk density of the powder produced. Nevertheless, provided the general principles of our invention are applied, the desired improved "B" powder with reduced shrinkage on sintering in relation to its bulk density will be obtained.

Although the invention has been described in detail with respect to the production of nickel powder, similar considerations apply in the case of the decomposition of iron carbonyl. Also, as explained above, the requisite small but effective amount of nuclei may be supplied by other means than the addition of oxygen. Thus in the case of nickel similar results are obtained by the addition of chlorine to the ingoing gas in an amount of between 0.002% and 0.005% by volume. An addition of from 5 to 50 parts per million of bromine vapour has also been found to be effective.

All values for bulk density mentioned above were determined either by use of a standard Scott volumeter, or more simply by loading the powder, without compacting, through a funnel into a 50 ml. measuring cylinder of approximately 1 in. diameter and weighing the cylinder containing the powder up to the 50 ml. mark. The values obtained by these two methods are found to agree within 0.08 gm./ml.

Values of shrinkage on sintering may vary with the type of mould, the dressing of the mould, the sintering atmosphere, and the temperature-time cycle during sintering, and accordingly all figures for shrinkage values in this specification have been determined by the following standard technique: The powder is charged, without compacting, into a slot 2 inches long, one quarter of an inch deep, and one quarter of an inch wide milled in a mild steel bar, levelled off, and covered with a flat mild steel lid resting on top of the bar. Before filling, the inside of the mould and the lid were coated with graphite as a lubricant dressing to prevent sticking. The sample was then placed in a furnace in an atmosphere of dry hydrogen, and sintered, the temperature being controlled so that the sample is heated up to 900° C. during 5 minutes and held at 900° C. for 15 minutes. The sample is then removed from the furnace and cooled in dry hydrogen. The shrinkage is measured as the percentage contraction of the length.

Where reference is made in the above description to decomposition temperature or to the temperature of the decomposer, the temperature meant is that measured in the conventional way by a thermocouple placed about three feet from the top of the standard decomposer and four inches from the outside wall.

It is to be observed that the present invention provides improved nickel and iron powder of the "B" type having, at a given bulk density, a low shrinkage on sintering, generally such that the linear shrinkage divided by the bulk density is less than 15% per gram per millilitre.

The invention further provides a "B" type nickel powder having a bulk density of about 0.9 gm./ml. and a linear shrinkage of 11–13%.

Moreover, the invention provides a process of making "B" type nickel and iron powder having a linear shrinkage lower than that of normal powder of the same bulk density.

It is to be noted that the present invention is not to be confused with prior art processes in which carbonyls are decomposed in the pressure of nuclei, or agents promoting the formation of nuclei, under conditions such as to give discrete particles. In such cases the purpose of the addition is to control the level and uniformity of the size of said discrete particles.

We claim:

1. Process for the production of light nickel or iron powder of the type consisting of aggregates of interlocking chains and fibres, having a linear shrinkage on sintering low in relation to its bulk density, wherein nickel or iron carbonyl vapour is thermally decomposed in a heated free space in the pressure of 0.01 to 0.08% of oxygen promoting the formation of nuclei for the carbonyl decomposition with the addition of a diluent gas in amount from 20% to 50% of the gases entering the decomposer to counteract the effect of the presence of said nuclei on the bulk density of said product.

2. Process for the production of light nickel powder, with a bulk density of from 0.6 to 1.2 gm./ml., of the type consisting of aggregates of interlocking chains and fibres, and having a ratio of linear shrinkage on sintering to bulk density not greater than 15 percent per gram per millilitre wherein nickel carbonyl is thermally decomposed in a heated free space in the presence of oxygen in amount from 0.02–0.06% and of carbon monoxide in amount from 30% to 40%, by volume of the gases entering the decomposer.

3. Process for the production of light nickel powder with a bulk density of about 0.9 gm./ml., of the type consisting of aggregates of interlocking chains and fibres having a linear shrinkage on sintering of 11–13% wherein nickel carbonyl is thermally decomposed in a free space in the presence of oxygen in amount from 0.02% to 0.06% and of a diluent gas in amount from 36% to 42% by volume of the gases entering the decomposer.

4. As a new article of manufacture, light nickel or iron powder of the type consisting of aggregates of interlocking chains and fibres, having a ratio of linear shrinkage on sintering to bulk density not greater than 15 percent per gram per millilitre.

5. As a new article of manufacture, light nickel powder of the type consisting of aggregates of interlocking chains or fibres, having a bulk density of about 0.9 gram per milliliter and a linear shrinkage on sintering of about 11% to about 13%.

6. A process for the production of light nickel or iron powder of the type consisting of aggregates of interlocking chains or fibers, having a linear shrinkage on sintering low in relation to its bulk density, wherein 0.01% to 0.08% of oxygen promoting the formation of nuclei for the carbonyl decomposition is introduced into nickel or iron carbonyl vapor to be decomposed, and thermally decomposing the nickel or iron carbonyl vapor in a heated free space with the addition of a diluent gas in amount from 20% to 50% of the gases entering the decomposer to counteract the effect of the presence of said nuclei on the bulk density of said product.

7. A process for producing light metal powder formed of metal of the group consisting of nickel and iron, of the type consisting of aggregates of interlocking chains or fibers and having a linear shrinkage on sintering low in relation to its bulk density by thermally decomposing metal carbonyl vapor, the steps comprising forming in a heated free space a suspension of specially-added nuclei for promoting carbonyl decomposition, the quantity of said specially-added nuclei introduced being small but effective to lower the bulk density of the product below the bulk density of a product produced in the absence of said specially-added nuclei, thermally decomposing carbonyl vapor of the group consisting of nickel carbonyl and iron carbonyl in the heated free space in the presence of the suspension of specially-added nuclei with the addition of a diluent gas in a quantity effective to substantially raise the bulk density of the product higher than the bulk density of a product produced in the absence of said diluent gas.

8. As a new article of manufacture, light nickel powder of the type consisting of aggregates of interlocking chains or fibers having a bulk density of about 0.6 to about 1.2 grams per milliliter and a linear shrinkage on sintering as defined by the area A—B—C—D—E in the accompanying drawing.

9. A process as claimed in claim 7, wherein oxygen is used to form the suspension of nuclei for promoting carbonyl decomposition.

10. A process as claimed in claim 7, wherein chlorine is used to form the suspension of nuclei for promoting carbonyl decompostion.

11. A process as claimed in claim 7, wherein bromine is used to form the suspension of nuclei for promoting carbonyl decomposition.

12. A process as claimed in claim 7, wherein hydrochloric acid is used to form the suspension of nuclei for promoting carbonyl decomposition.

13. A process as claimed in claim 7, wherein nitric acid is used to form the suspension of nuclei for promoting carbonyl decomposition.

References Cited in the file of this patent

UNITED STATES PATENTS

| | | |
|---|---|---|
| 1,663,916 | Mittasch et al. | Mar. 27, 1928 |
| 1,836,732 | Schlecht et al. | Mar. 4, 1930 |
| 1,840,286 | Hochheim | Jan. 5, 1932 |
| 2,726,951 | Ramsey et al. | Dec. 13, 1955 |
| 2,776,200 | Wallis | Jan. 1, 1957 |
| 2,791,497 | Schlecht et al. | May 7, 1957 |

UNITED STATES PATENT OFFICE

CERTIFICATE OF CORRECTION

Patent No. 2,844,456    July 22, 1958

David M. Llewelyn et al.

It is hereby certified that error appears in the above numbered patent requiring correction and that the said Letters Patent should read as corrected below.

In the heading to the printed specification, between lines 8 and 9, insert -- Claims priority, application Great Britain December 15, 1953 --; column 1, line 26, for "microscopic" read -- macroscopic --; column 5, lines 32 and 43, for "pressure", each occurrence, read -- presence --.

Signed and sealed this 4th day of November 1958.

(SEAL)
Attest:

KARL H. AXLINE
Attesting Officer

ROBERT C. WATSON
Commissioner of Patents